Y. SAKAI.
ELECTRICAL TERMINAL.
APPLICATION FILED JAN. 7, 1911.

1,049,404.

Patented Jan. 7, 1913.

WITNESSES:
C. L. Belcher
Otto S. Schairer

INVENTOR
Yuudio Sakai
BY
ATTORNEY

UNITED STATES PATENT OFFICE.

YASUDIRO SAKAI, OF EAST PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL TERMINAL.

1,049,404.

Specification of Letters Patent. Patented Jan. 7, 1913.

Application filed January 7, 1911. Serial No. 601,321.

*To all whom it may concern:*

Be it known that I, YASUDIRO SAKAI, a subject of the Emperor of Japan, and a resident of East Pittsburgh, in the county of Allegheny and State of Pennsylvania, have invented a new and useful Improvement in Electrical Terminals, of which the following is a specification.

My invention relates to terminals for electrical apparatus, such as mercury vapor rectifiers and lamps, and other devices having vacuum chambers, and it has for its object to provide a vacuum-tight terminal in which the parts shall not be subjected to undue strains.

Figure 1:
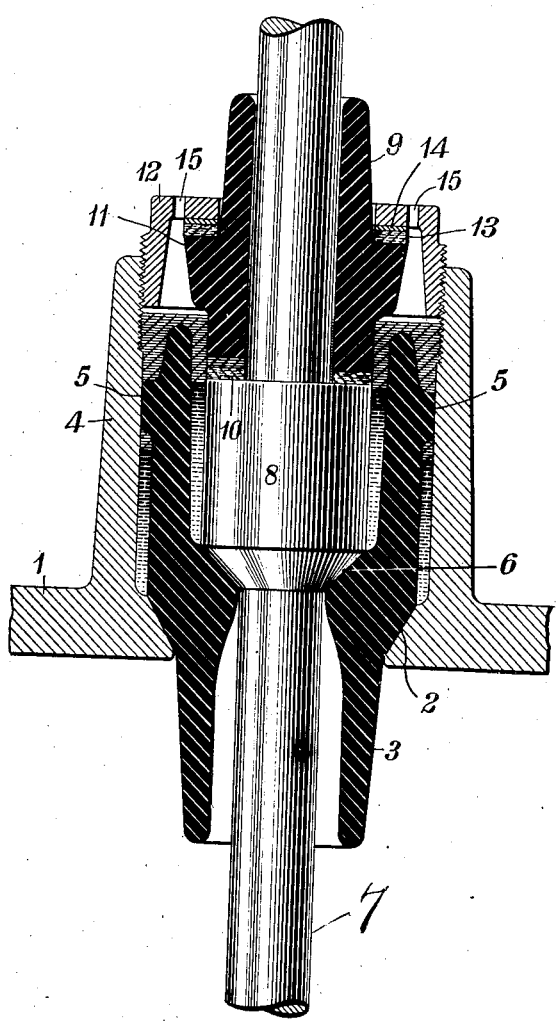
Figure 2:
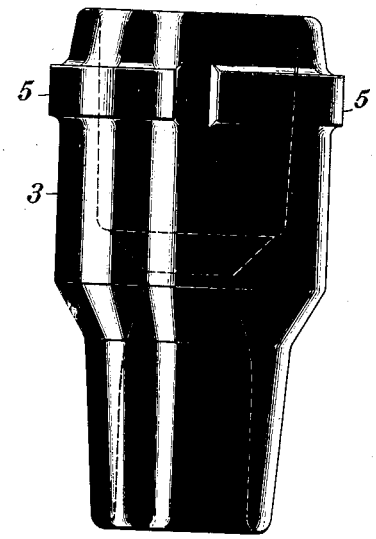

Figure 1 of the accompanying drawing is a sectional view through a portion of a device that is provided with a terminal constructed in accordance with the present invention, and Fig. 2 is a side view of one of the insulating bushings of the terminal.

The casing 1 of the rectifier, or other device in connection with which the present invention is employed, is provided with an aperture having inwardly tapered or beveled edges constituting a seat 2 for a correspondingly shaped external shoulder upon an insulating bushing 3 that extends through the aperture into the casing. The casing is provided, upon its exterior, adjacent to the aperture therein, with a cylindrical sleeve or extension 4 that loosely surrounds the upper portion of the bushing 3, and the said bushing is provided, near its upper end, with external circumferentially extending bosses 5 that serve to maintain the bushing substantially central within the said sleeve or extension. The bushing 3 is further provided, upon its interior, with a tapered or beveled seat 6 for a correspondingly shaped shoulder upon a conducting rod 7 that constitutes one of the terminals or leads of the rectifier or other device, the shoulder upon the rod 7 being the lower annular face of a local enlargement 8 thereof. Except for the tapered end of the enlargement 8, which engages the internal seat 6 in the bushing 3, the conducting rod 7 is loosely surrounded by the said bushing. The tapered shoulders and seats upon the parts 1, 3 and 7 are preferably ground, in order that they may fit closely together, and, when pressed into engagement with each other, will provide substantially vacuum or air-tight joints.

Above the bushing 3, the rod 7 is surrounded by another insulating bushing 9, the lower end of which bears upon an asbestos or other suitable slightly compressible washer 10 that is interposed between the bushing and the upper annular face of the enlargement of the rod 7. As the lower end of the bushing 9 extends for a short distance into the upper end of the bushing 3, the rod 7 is more effectively insulated from the sleeve or extension 4 than would otherwise be the case. The bushing 9 is provided, upon its exterior, with a flange or shoulder 11, to which pressure is applied for forcing the tapered shoulders upon the bushing 3 and the rod 7 against the respective seats 2 and 6, by means of a nut or collar 12 that is screwed into the sleeve or extension 4.

A slightly compressible washer 13, such as one composed of asbestos, is placed directly upon the flange or shoulder 11 on the bushing 9 in order that the pressure applied thereto by the nut 12 may be effectively distributed over its surface. The function of the washer 10 is similar to that of the washer 13. A steel or other metal washer 14 is interposed between the compressible washer 13 and the nut 12, in order to protect the compressible washer from mechanical injury that might otherwise result from adjustment of the nut.

The spaces between the bushing 3 and the sleeve or extension 4 and between the bushing 3 and the conducting rod 7 are partially occupied by mercury, which serves to improve the tightness of the joints between the insulating bushing, the conducting rod and the casing. In order to permit of pouring the mercury into the said spaces after the other parts are assembled, the nut or collar 12 is provided with apertures 15 upon its upper face, and a space is provided between the inner circumferential face of said nut or collar and the flange upon the bushing 9.

If the device in connection with which the present terminal is employed is to be adapted for use upon railway vehicles, or for transportation by any means, a gum, such as paraffin or other suitable insulating composition, may be poured through the apertures 15 in the nut 12 into the upper portions of the spaces between the bushing 3 and the sleeve 4 and conducting rod 7, the gum or other composition being such that it will harden or set after having been poured into the said spaces. The mercury is thus maintained in the spaces and cannot be spilled, and it is also prevented from vaporizing. The lower end of the bushing 9 is provided with notches that permit the gum, in liquid condition, to flow into the space between the bushing and the rod 8.

I claim as my invention:

1. The combination with a casing having an aperture and a conductor projecting through the aperture into the casing, of an insulating bushing surrounding the conductor and provided with a seat therefor and itself seated in the casing, its upper portion being spaced from both the conductor and the casing and constituting a barrier between them, bodies of mercury occupying the spaces between the bushing and the casing and between the bushing and the conductor, and a single device for forcing both the bushing and the conductor against their seats.

2. The combination with an apertured casing, and an insulating bushing seated in the casing aperture, of a conductor seated in the bushing and extending into the casing, another bushing surrounding and seated on the conductor, and means making adjustable engagement with the casing and adapted to force the several parts against their respective seats.

3. The combination with an apertured casing, and an insulating bushing seated in the casing aperture, of a conductor seated in the bushing and extending into the casing, another bushing surrounding the conductor, and means engaging the casing for applying pressure to the latter bushing to force the several parts against their respective seats.

4. The combination with an apertured casing, and an insulating bushing seated in the casing aperture, of a conductor seated in the bushing and extending into the casing, another bushing surrounding the conductor, and a nut screwed into the casing and bearing upon the latter bushing for forcing the several parts against their respective seats.

5. The combination with a casing having an aperture and a conductor extending through said aperture into the casing, of an insulating bushing surrounding the conductor and provided with a seat therefor and itself seated in the casing, its upper portion being spaced from both the conductor and the casing and constituting a barrier between them, bodies of mercury occupying the spaces between the bushing and the casing and between the bushing and the conductor, another bushing surrounding the conductor, and means for applying pressure to the latter bushing.

6. The combination with a casing having an aperture the edges of which constitute a seat, and a cylindrical extension surrounding the aperture, of a bushing within the extension and projecting into the casing, the bushing being provided with an external shoulder to engage the seat on the casing, and also with an internal seat, a conductor extending through the bushing into the casing and having an enlargement to engage the internal seat in the bushing, another insulating bushing surrounding the conductor and seated upon the enlargement thereof, and means for applying pressure to the latter bushing.

7. The combination with a casing having an aperture the edges of which constitute a seat, and a cylindrical extension surrounding the aperture, of a bushing within the extension and projecting into the casing, the bushing being provided with an external shoulder to engage the seat on the casing and also with an internal seat, a conductor extending through the bushing into the casing and having an enlargement to engage the internal seat of the bushing, another insulating bushing surrounding the conductor and seated upon the enlargement thereof, and a nut screwed into the extension of the casing and adapted to apply pressure to the latter bushing.

In testimony whereof, I have hereunto subscribed my name this 30th day of Dec. 1910.

YASUDIRO SAKAI.

Witnesses:
  A. W. COPLEY,
  B. B. HINES.